United States Patent
Dahan

(10) Patent No.: US 7,738,570 B2
(45) Date of Patent: Jun. 15, 2010

(54) SENDER, RECEIVER AND METHOD OF TRANSFERRING INFORMATION FROM A SENDER TO A RECEIVER

(75) Inventor: Nir Dahan, Munich (DE)

(73) Assignee: Qimonda AG, Munich (DE)

(*) Notice: Subject to any disclaimer, the term of this patent is extended or adjusted under 35 U.S.C. 154(b) by 809 days.

(21) Appl. No.: 11/615,418

(22) Filed: Dec. 22, 2006

(65) Prior Publication Data

US 2008/0152026 A1 Jun. 26, 2008

(51) Int. Cl.
*H04L 27/00* (2006.01)
(52) U.S. Cl. ....................................... 375/259
(58) Field of Classification Search ................. 375/259, 375/295, 316
See application file for complete search history.

(56) References Cited

U.S. PATENT DOCUMENTS 6,025,791 A 2/2000 Tonks 6,865,235 B2 * 3/2005 Khoini-Poorfard .......... 375/272
2007/0260914 A1 * 11/2007 Pogrebinsky ................. 714/5

FOREIGN PATENT DOCUMENTS

DE 197 41 301 A1 4/1998

* cited by examiner

*Primary Examiner*—Don N Vo
(74) *Attorney, Agent, or Firm*—Patterson & Sheridan, L.L.P.

(57) ABSTRACT

Embodiments of the invention provide methods and apparatus for transferring information from a sender to a receiver, a symbol is selected out of a plurality of symbols representing the information, wherein each of the plurality of symbols representing the information comprises a number of digits, the number of digits equaling a number of parallel lines coupling the sender and the receiver. The digits of the selected symbol are sent from the sender to the receiver, wherein, via each of the number of lines, a signal representing one of the number of digits of the selected symbol is transferred. In the step of selecting a symbol, the symbol is selected such that the symbol differs from a lastly transferred symbol by one digit.

26 Claims, 5 Drawing Sheets

LEGEND

| | |
|---|---|
| 2 | TRANSFER CHANNEL |
| 3 | PARALLEL LINES |
| 10 | SENDER |
| 11 | OUTPUT OF THE SENDER |
| 12 | OUTPUT CIRCUIT |
| 13 | SYMBOL SELECTION CIRCUIT |
| 15 | SENDER FURTHER CIRCUITRY |
| 20 | RECEIVER |
| 21 | INPUT OF THE RECEIVER |
| 22 | DETECTION CIRCUIT |
| 23 | SYMBOL IDENTIFICATION CIRCUIT |
| 24 | RECEIVER FURTHER CIRCUITRY |

LEGEND

2     TRANSFER CHANNEL
3     PARALLEL LINES
10    SENDER
11    OUTPUT OF THE SENDER
12    OUTPUT CIRCUIT
13    SYMBOL SELECTION CIRCUIT
15    SENDER FURTHER CIRCUITRY
20    RECEIVER
21    INPUT OF THE RECEIVER
22    DETECTION CIRCUIT
23    SYMBOL IDENTIFICATION CIRCUIT
24    RECEIVER FURTHER CIRCUITRY

LEGEND

2     TRANSFER CHANNEL
10    SENDER
11    OUTPUT OF THE SENDER
12    OUTPUT CIRCUIT
14    CLOCK LINE
20    RECEIVER
21    INPUT OF THE RECEIVER
22    DETECTION CIRCUIT
23    SYMBOL IDENTIFICATION CIRCUIT
25    FIRST XOR-GATE
26    INVERTERS
27    SECOND XOR-GATE

LEGEND

2 TRANSFER CHANNEL
10 SENDER
11 OUTPUT OF THE SENDER
12 OUTPUT CIRCUIT
14 CLOCK LINE
20 RECEIVER
21 INPUT OF THE RECEIVER
22 DETECTION CIRCUIT
23 SYMBOL IDENTIFICATION CIRCUIT
25 FIRST XOR-GATE
27 SECOND XOR-GATE
36 SECOND FLIP-FLOP FF2

LEGEND

2     TRANSFER CHANNEL
10   SENDER
11   OUTPUT OF THE SENDER
12   OUTPUT CIRCUIT
14   CLOCK LINE
20   RECEIVER
21   INPUT OF THE RECEIVER
22   DETECTION CIRCUIT
23   SYMBOL IDENTIFICATION CIRCUIT
25   FIRST XOR-GATE
26   INVERTERS
27   SECOND XOR-GATE
41, 42    RECEIVING FLIP-FLOPS
44   CLOCK LINE PROVIDING AN INTERNAL CLOCK SIGNAL OF THE RECEIVER

SENDER, RECEIVER AND METHOD OF TRANSFERRING INFORMATION FROM A SENDER TO A RECEIVER

BACKGROUND

1. Field of the Invention

The present invention generally relates to data transmission methods and devices for carrying out the same.

2. Description of the Related Art

High-speed data transfer across a transmission channel is always challenging, in particular as the data transfer rates are increased. Accordingly, there is a continuing need for improved data transmission methods and devices.

SUMMARY

Embodiments of the present invention provide an improved transfer of information from a sender to a receiver via a number of parallel lines, for an improved sender, and for an improved receiver.

BRIEF DESCRIPTION OF THE DRAWINGS

The features of embodiments of the present invention will become clear from the following description, taking in conjunction with the accompanying drawings. It is to be noted, however that the accompanying drawings illustrate only typical embodiments of the present invention and are, therefore, not to be considered limiting of the scope of the invention. The present invention may admit other equally effective embodiments.

DETAILED DESCRIPTION

Figure 1:
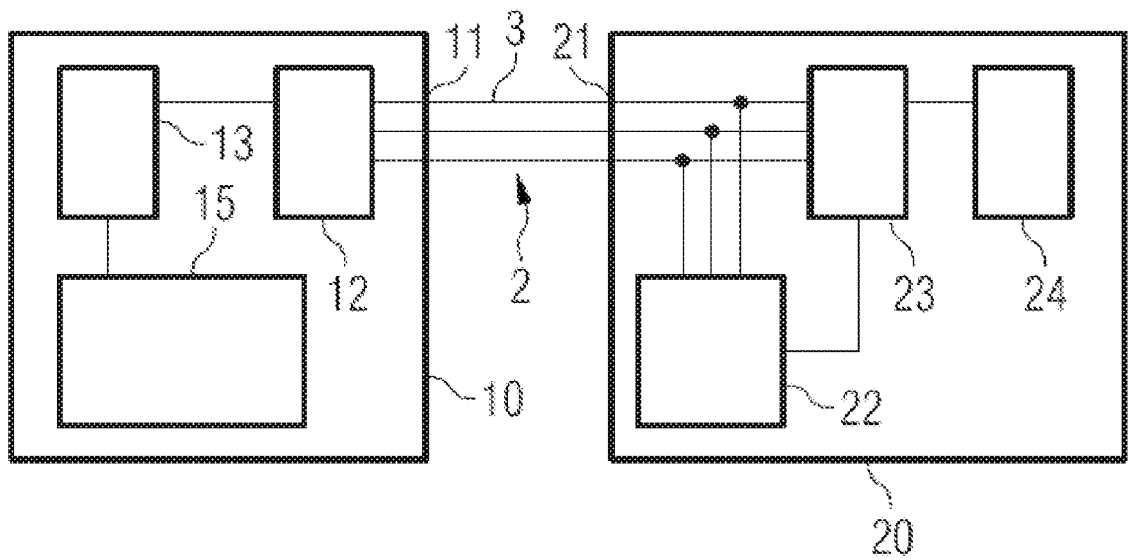
FIG. 1 shows a schematic diagram of a sender according to a first embodiment of the present invention and a receiver according to a second embodiment of the present invention.

High-speed data transfer across a transmission channel is always challenging, in particular as the data transfer rates are permanently increased. Usually, the data, or information, are sent synchronized to a clock of the sender. At the receiver, this clock is recovered from the received signals. Alternatively, the clock-signal is transmitted parallel to the data-signals. In both cases, the production, transfer or recovery of the clock and the transmission and detection of the signals synchronous to the clock necessitate complex circuitry and cause considerable delay.

In one embodiment of the present invention there is a method of transferring information from a sender to a receiver. A symbol is selected out of a plurality of symbols representing the information, wherein each of the plurality of symbols representing the information comprises a number of digits, the number of digits equaling a number of parallel lines coupling the sender and the receiver. The digits of the selected symbol are sent from the sender to the receiver, wherein, via each of the number of lines, a signal representing one of the number of digits of the selected symbol is transferred. In the step of selecting a symbol, the symbol is selected such that the symbol differs from a lastly transferred symbol in one digit.

In another embodiment of the present invention, there is a integrated circuit with a sender. The sender comprises a number of outputs and an output circuit coupled to the number of outputs and transferring symbols via the number of outputs, wherein each symbol comprises a number of digits, the number of digits equaling the number of outputs, and the output circuit transferring, via each of the number of outputs, a signal representing one of the number of digits. The sender further comprises a symbol selection circuit receiving information and selecting a symbol out of a plurality of symbols representing the information, the symbol selection circuit selecting the symbol such that the symbol differs from a lastly transferred symbol by one digit.

In still another embodiment of the present invention there is a integrated circuit with a receiver. The receiver comprises a number of inputs and a detection circuit coupled to the number of inputs and receiving symbols via the number of inputs, wherein each symbol comprises of a number of digits, the number of digits equaling the number of inputs, the detection circuit receiving, via each of the number of inputs, a signal representing one of the number of digits, and the detection circuit detecting an incoming symbol from a change of one signal at the number of inputs. The receiver further comprises a symbol identification circuit receiving, controlled by the detection circuit, the incoming symbol and identifying information represented by the symbol when the detection circuit detects an incoming symbol.

In still another embodiment of the present invention there is a system transferring information, the system comprising a sender and a receiver. The sender comprises a number of outputs and an output circuit coupled to the number of outputs and transferring symbols via the number of outputs, wherein each symbol comprises a number of digits, the number of digits equaling the number of outputs, and the output circuit transferring, via each of the number of outputs, a signal representing one of the number of digits. The sender further comprises a symbol selection circuit receiving information and selecting a symbol out of a plurality of symbols representing the information, the symbol selection circuit selecting the symbol such that the symbol differs from a lastly transferred symbol in one digit. The receiver comprises a number of inputs and a detection circuit coupled to the number of inputs and receiving symbols via the number of inputs, wherein each symbol comprises of a number of digits, the number of digits equaling the number of inputs, the detection circuit receiving, via each of the number of inputs, a signal representing one of the number of digits, and the detection circuit detecting an incoming symbol from a change of one signal at the number of inputs. The receiver further comprises a symbol identification circuit receiving, controlled by the detection circuit, the incoming symbol and identifying information represented by the symbol when the detection circuit detects an incoming symbol.

In all the embodiments described or claimed in this application, the lines are electrically conductive wires or light-guides or any other device capable of providing a transfer of electrical, optical, electromagnetic or other signals from the sender to the receiver. Each line may or may not contain a tangible or material connection of the sender and the receiver.

FIG. 1 shows a schematic diagram of a sender 10 according to a first embodiment of the present invention and a receiver 20 according to a second embodiment of the present invention. The sender 10 and the receiver 20 are coupled to each other via a transfer channel 2 containing a number of parallel lines 3. In all the embodiments described or claimed in this application, the lines 3 are electrically conductive wires or light-guides or any other device capable of providing a transfer of electrical, optical, electromagnetic or other signals from the sender 10 to the receiver 20. Each line 3 of the transfer channel 2 couples a corresponding output 11 of the sender 10 and a corresponding input 21 of the receiver 20. The number of outputs 11 of the sender 10 and the number of inputs 21 of the receiver 20 equal the number of lines 3 of the transfer channel 2.

While all the embodiments described with reference to the figures merely refer to a transfer of any kind of data or information from the sender 10 to the receiver 20, the embodiments are not to be understood such that no transfer of data or information shall be possible in the reverse direction. Rather, the transfer channel 2 can provide for unidirectional or bidirectional communication.

The sender 10 contains an output circuit 12 coupled to the outputs 11, a symbol selection circuit 13 and sender further circuitry 15 schematically represented by a box. The symbol selection circuit 13 is coupled to the sender further circuitry 15 and to the output circuit 12.

The receiver 20 contains a detection circuit 22 coupled to the inputs 21, a symbol identification circuit 23 coupled to the inputs 21 and receiver further circuitry 24 coupled to the symbol identification circuit 23 and schematically represented by a box.

As an example, the sender 10 is a memory controller, the receiver 20 is a memory device, and control information controlling the operation of the memory device is transferred from the memory controller to the memory device via the transfer channel 2. The sender further circuitry 15 produces control information controlling the operation of the memory device. This control information is transferred to the memory device via the symbol selection circuit 13, the output circuit 12, the outputs 11, the lines 3 of the transfer channel 2, the inputs 21 and the symbol identification circuit 23. In this case, the receiver further circuitry 24 may represent the core or array of memory cells of the memory device the operation of which is controlled by the control information.

As a further example, the sender 10 is a memory device, the receiver 20 is a memory controller, and information indicating an operational state of the memory device is transferred from the memory device to the memory controller. In this case, the sender further circuitry 15 is for example a core or array of memory cells or an address decoder or any other sub-circuit of the memory device the operational state of which needs to be known by further circuitry 24 of the memory controller.

In both examples described in the last two paragraphs as well as in other applications of the sender 10 and the receiver 20, information is transferred from the sender 10 to the receiver 20 in the subsequently described way. The symbol selection circuit 13 receives information from the sender further circuitry 15 of the sender 10 and selects the symbol out of a predetermined plurality of predetermined symbols representing the information. Each symbol consists of a number of digits wherein the number of digits equals the number of outputs 11 of the sender 10, the number of lines 3 of the transfer channel 2 and the number of inputs 21 of the receiver 20. Each digit of each symbol may take on one of a predetermined plurality of predetermined value. As an example the predetermined plurality of predetermined values comprises two predetermined values ("0" and "1"; binary representation of the information) or three predetermined values ("0", "1" and "2"; ternary representation of the information) or four predetermined values ("0", "1", "2", "3"; quaternary representation of the information) or eight predetermined values ("0", "1", "2", ..., "7"; octal representation of the information) or ten predetermined values ("0", "1", "2", ..., "9"; decimal representation of the information) or sixteen predetermined values ("0", "1", "2", ..., "9", "A", "B", ..., "F"; hexadecimal representation of the information) or any other number of predetermined values.

The symbol selection circuit always selects a symbol which differs from a symbol lastly transferred via the transfer channel 2 by one digit. This is preferably true irrespective of the time elapsed since the lastly transferred symbol was transferred. If there is a need to consecutively transfer the same information, a symbol rotation is necessary. In other cases, e.g. in the above-described examples of transfer of information or control information between a memory controller and a memory device, there is no need to transfer the same information twice consecutively. In the latter case, no symbol rotation is required.

Alternatively, the symbol selection circuit selects a symbol which differs from the symbol lastly transferred in any number of digits. Thus, it is preferred but not necessary for the present invention that always exactly one digit (and a corresponding signal) change.

The output circuit 12 transfers the symbol selected by the symbol selection circuit 13 to the receiver 20 via the outputs 11 and the lines 3 of the transfer channel 2. Thereby, each digit of the symbol is represented by one signal transferred by one of the lines 3 of the transfer channel 2, and, via each line 3 of the transfer channel 2, one signal representing one digit of the symbol is transferred. Preferably, each predetermined value of a digit is represented by a corresponding level out of a predetermined plurality of predetermined levels wherein each predetermined level is an electrostatic potential or voltage, an intensity, a wavelength, a field strength or any other signal level. Since the symbol selected by the symbol selection circuit 13 differs from the lastly transferred symbol by one digit, the signal at one of the lines 3 of the transfer channel 2 changes.

At the receiver 20, the detection circuit 22 detects the change of one signal at one of the inputs 21 of the receiver 20 and controls a identification of the (new) symbol by the symbol identification circuit 23. Responding to the change of one signal, the symbol identification circuit 23 identifies the newly received symbol by identifying all the signals received via the inputs 21. Each digit of the symbol is identified by identifying one level out of the predetermined plurality of predetermined levels. In other words, the symbol identification circuit 23 determines to which of the predetermined levels the actual signal corresponds. The symbol identification circuit 23 identifies the information represented by the symbol and gives this information to the receiver further circuitry 24.

Binary digits each being either "0" or "1" can be particularly advantageous as the majority of conventional digital circuits implement binary logics and communicate via binary signals. In this case, any signal may take either a predetermined low level (i.e. a level below a first predetermined threshold) or a predetermined high level (i.e. a level above a second predetermined threshold). The embodiments described below with respect to the FIGS. 2 to 5 are examples for a binary implementation of the present invention.

Figure 2:
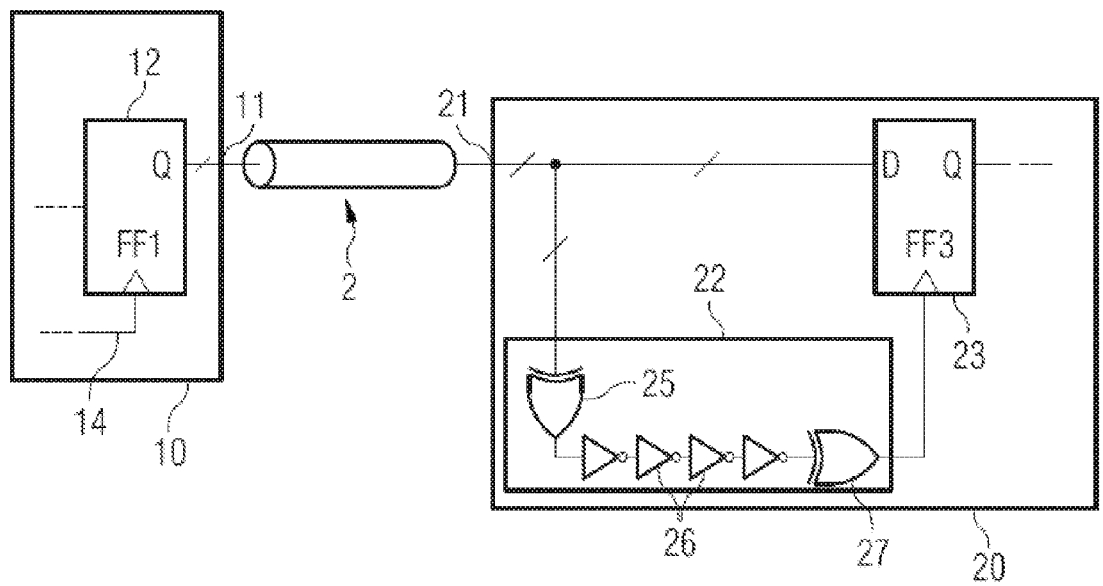
FIG. 2 shows a schematic diagram of a sender according to a third embodiment of the present invention and a receiver according to a fourth embodiment of the present invention.

FIG. 2 shows a schematic diagram of a sender 10 according to a third embodiment of the present invention and a receiver 20 according to a fourth embodiment of the present invention. In the sender 10, a first flip-flop FF1 is or schematically represents an output circuit 12 corresponding to the output circuit described above with reference to FIG. 1. The flip-flop FF1 contains a number of parallel single-line flip-flops each of which is coupled to one output 11. A symbol selection circuit and further circuitry of the sender 10 is preferably similar to the sender described above with reference to FIG. 1 and is, therefore, not shown in FIG. 2.

The output circuit 12 of the sender 10 is coupled to the receiver 20 via a number of outputs 11 of the sender 10, a number of parallel lines forming a transfer channel 2 and a number of inputs 21 of the receiver 20. The number of outputs 11 and the number of inputs 21 equal the number of parallel lines of the transfer channel 2.

The receiver 20 contains a detection circuit 22 and a symbol identification circuit 23. The detection circuit 22 contains a first XOR-gate 25, an even number of inverters 26 and a second XOR-gate 27. Inputs of the first XOR-gate 25 are coupled to the inputs 21 of the receiver 20. A first input of the second XOR-gate 27 is directly coupled to an output of the first XOR-gate 25. A second input of the second XOR-gate 27 is coupled to the output of the first XOR-gate 25 via a serial coupling of the even number of inverters 26.

The symbol identification circuit 23 is a flip-flop FF3 containing a number of single-line flip-flops. A data input of the flip-flop FF3 is coupled to the inputs 21 of the receiver 20, the data input of each single-line flip-flop of the flip-flop FF3 being coupled to a corresponding one of the inputs 21. A clock input of the flip-flop FF 3 is coupled to an output of the second XOR-gate 27. A data output of the flip-flop FF3 is coupled to a further circuitry which is not displayed in FIG. 2.

In response to an internal clock signal at the clock line 14 of the sender 10, the flip-flop FF1 of the sender 10 transmits a number of signals to the receiver 20 via the outputs 11 of the sender 10, the transfer channel 2 and the inputs 21 of the receiver 20. The number of signals equals the number of outputs 11, the number of parallel lines of the transfer channel 2 and the number of inputs 21. One of the number of signals is transferred via each of the lines of the transfer channel 2. Each signal represents one digit of a symbol. The symbol is selected such that the symbol differs from a lastly transferred symbol by one digit. Correspondingly, one signal changes from a first predetermined level to a second predetermined level at the transition from the lastly transferred symbol to the present symbol.

In the receiver 20, the output of the first XOR-gate 25 changes whenever exactly one signal or digit at its inputs changes. The serial connection of the inverters 26 delays this change. Therefore, for a short period of time, there are different signals or digits at the inputs of the second XOR-gate 27 and, within this short period of time, the second XOR-gate 27 outputs a pulse triggering the flip-flop FF3 via its clock input. In this way, the symbol itself signals the arrival of new information to the receiver 20.

Figure 3:
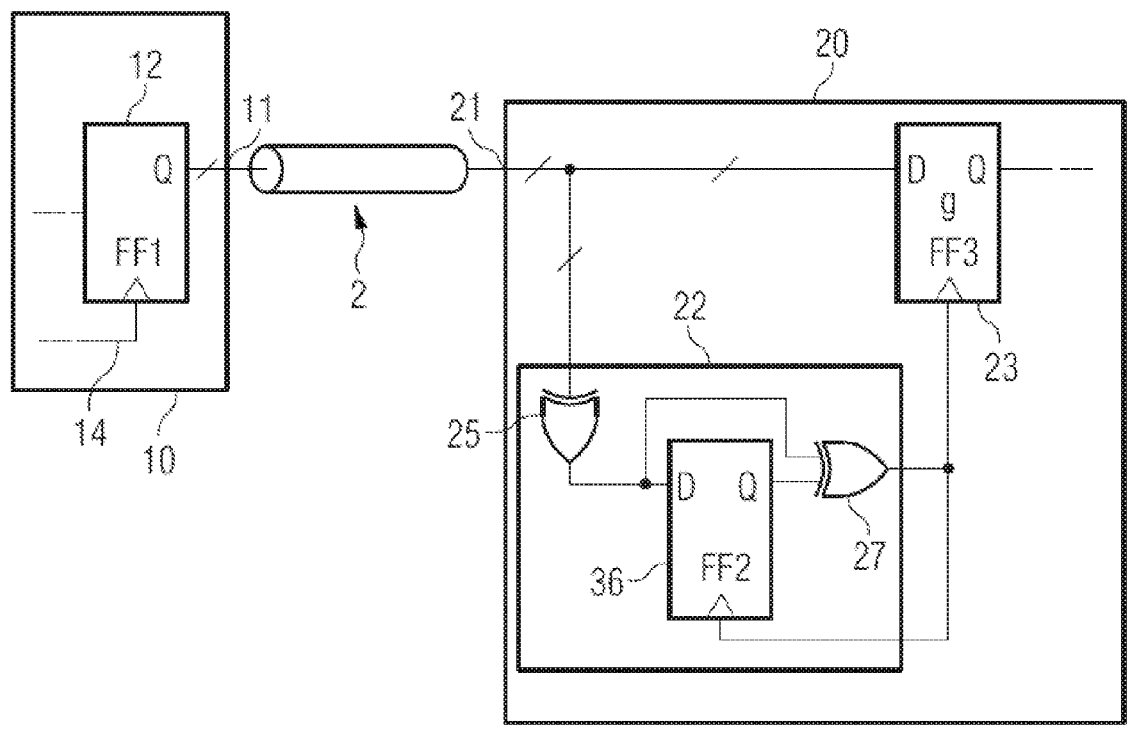
FIG. 3 shows a schematic diagram of the sender according to the third embodiment of the present invention and a receiver according to a fifth embodiment of the present invention.

FIG. 3 shows a schematic diagram of the sender 10 according to the third embodiment of the present invention and a receiver 20 according to a fifth embodiment of the present invention. The receiver 20 according to the fifth embodiment differs from the receiver according to the fourth embodiment described above with reference to FIG. 2 in the internal circuitry of the detection circuit 22. The detection circuit 22 of the receiver 20 according to the fifth embodiment containing a first XOR-gate 25 and a second XOR-gate 27 coupled to inputs 21 of the receiver 20 and a clock input of a flip-flop FF3 similar to the receiver according to the second embodiment of the present invention. However, the serial connection of an even number of inverter 26 according to the fourth embodiment is replaced by a second flip-flop FF2 (reference numeral 36). The output of the first XOR-gate 25 is coupled to a data input of the second flip-flop FF2 and to a first input of the second XOR-gate 27. A data output of the second flip-flop FF2 is coupled to a second input of the second XOR-gate 27. A clock input of the second flip-flop FF2 is coupled to the output of the second XOR-gate 27.

Figure 4:
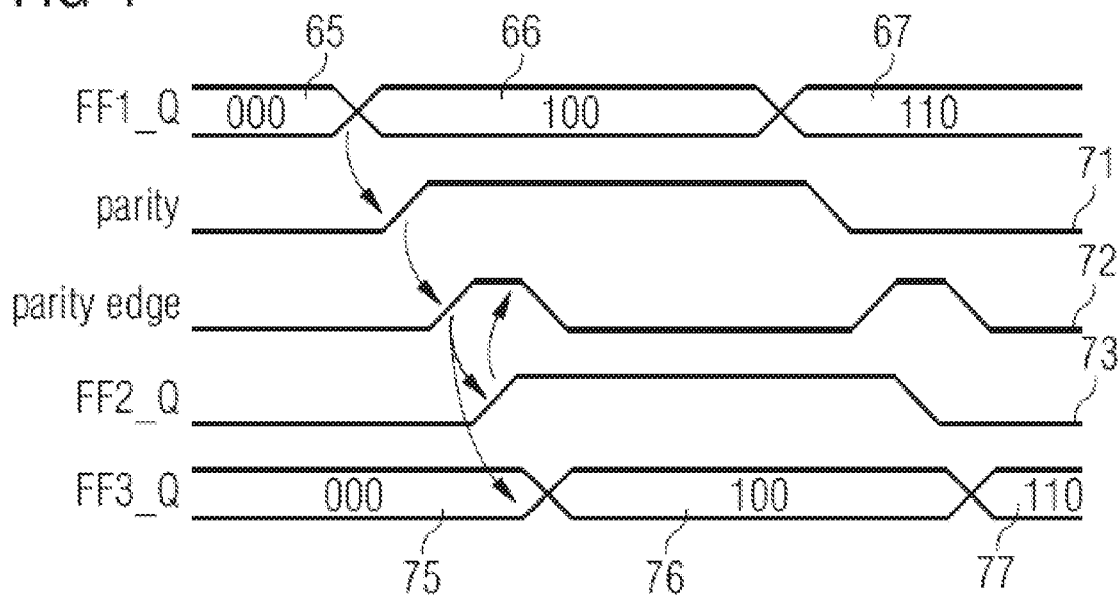
FIG. 4 shows a schematic diagram of signals in the receiver according to the fifth embodiment.

The operation of the receiver 20 according to the fifth embodiment described-above with reference to FIG. 3 is now described with reference to FIG. 4. In FIG. 4, the time dependence of a number of signals in the receiver 20 are schematically represented. The time increases from left to right.

The uppermost line represents signals at the inputs 21 of the receiver 20. These signals are originally provided by the flip-flop FF1 of the sender 10 and arrive at the inputs 21 of the receiver 20 with some delay which may vary from line to line of the transfer channel 2. However, any clock skew, i.e. any differences in the timing of the signals transferred via the different lines of the transfer channel 2 does not defined cause any problems. The transitions between data eyes 65, 66, 67 are always well-defined since only one signal changes from a first level to a second level between any two consecutive data eyes.

Examples for three bit symbols represented by the signals within the data eyes 65, 66, 67 are given in FIG. 4, wherein within the first data eye 65 a symbol 000, within a second data eye 66 a symbol 100 and within the third data eye 67 a symbol 110 are transmitted.

Since exactly one digit signal changes at any transition between a pair of consecutive data eyes or symbols, there is a change of the parity at any transition from lastly transferred symbol 65 (66) to a present symbol 66 (67). The signal 71 at the output of the first XOR-gate 25 indicates the parity and edges in the parity signal 71 indicate the changes of the parity with short delays. A parity edge signal 72 at the output of the second XOR-gate 27 provides short pulses comprising a rising edge and a falling edge a short delay after each edge of the parity signal 71. The rising edge is produced by the second XOR-gate 27 when the new level of the parity signal 71 is provided to the first input of the second XOR-gate 27 and the old level of the parity signal 71 is provided to the second input of the second XOR-gate 27. When the parity edge signal 72 at the output of the second XOR-gate 27 is high, this triggers the second flip-flop FF2 36 to provide the new level of the parity signal 71 to the second input of the second XOR-gate 27 via its data output Q. Thereafter, the same signal levels are provided to both inputs of the second XOR-gate 27 and the parity edge signal 72 at the output of the second XOR-gate 27 provides a falling edge down to the low level.

The short pulse of the parity edge signal 72 is provided to the clock input of the flip-flop FF3 and causes the data output Q of the flip-flop FF3 to transit from a first symbol 75 (in the above example: 000) to the second symbol 76 (in the above example: 100) or from the second symbol 76 (in the above example: 100) to the third symbol 77 (in the above example: 110).

The timing diagram of FIG. 4 clearly shows that the information provided by the sender 10 (data eyes or symbols 65, 66, 67) is transferred to, detected and identified by the receiver 20 (data eyes or symbols 75, 76, 77) with a minimum delay. In particular, the delay is short when compared to conventional clock recovery or other conventional techniques. Further, new information can be transferred from the sender 10 to the receiver 20 whenever necessary rather than only at certain moments defined by a clock.

Figure 5:
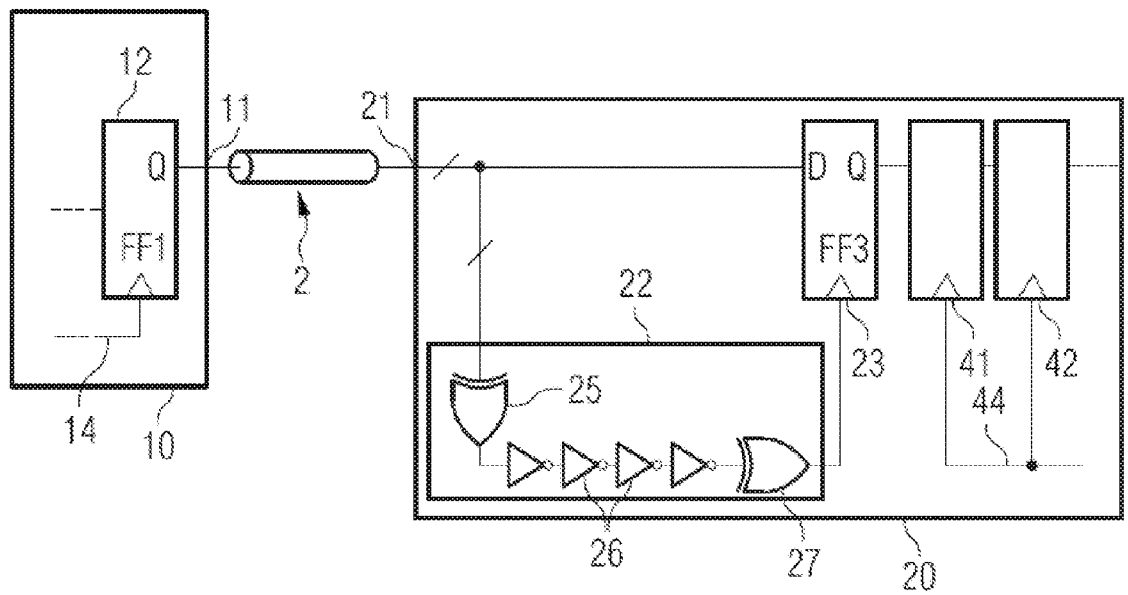
FIG. 5 shows a schematic diagram of the sender according to the third embodiment of the present invention and a receiver according to a sixth embodiment of the present invention.

FIG. 5 shows the sender 10 according to the third embodiment of the present invention together with a receiver 20 according to a sixth embodiment of the present invention. Similar to the embodiments described above with reference to FIGS. 2 to 4, information is transferred from the sender 10 to the receiver 20 via a number of outputs 11 of the sender 10, a number of parallel lines of a transfer channel 2 and a number of inputs 21 of the receiver 20. Similar to the embodiments described above, symbols representing the information are detected by a detection circuit 22 and identified by a symbol identification circuit 23. The internal circuitry of the detection circuit 22 corresponds to the internal circuitry of the detection circuit of the fourth embodiment described above with reference to FIG. 2. The receiver 20 according to the sixth embodiment differs from the receiver according to the fourth embodiment by a serial connection of two receiving flip-flops 41, 42 coupled to the data output Q of the flip-flop FF3 representing the symbol identification circuit 23. The receiving flip-flops 41, 42 are controlled via a clock line 44 providing an internal clock signal of the receiver 20 to the receiving flip-flops 41, 42. The receiving flip-flops 41, 42 provide for a synchronization of the received information to the internal clock of the receiver 20.

Figure 6:
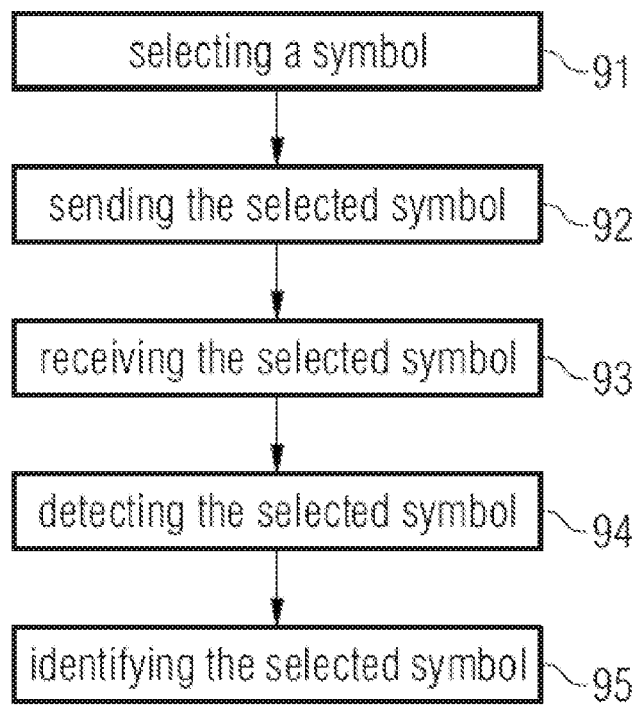
FIG. 6 shows a schematic flowchart of a method according to a seventh embodiment of the present invention.

FIG. 6 is a schematic flowchart of a method of transferring information from a sender to a receiver via a number of parallel lines coupling the sender and the receiver. In a first step 91, a symbol is selected from a plurality of symbols representing information to be transferred to the receiver, wherein each of the plurality of symbols representing the information consists of a number of digits, the number of digits equaling the number of parallel lines coupling the sender and the receiver. The symbol is selected such that the symbol differs from a lastly transferred symbol (i.e. the last symbol transferred) by exactly one digit.

In a second step 92, the selected symbol is sent from the sender to the receiver by simultaneously sending the digits of the symbol. A signal representing one of the number of digits of the selected symbol is transferred via each of the number of lines.

In a third step 93 the selected symbol is received by the receiver. In a fourth step 94, the selective symbol is detected by detecting the change of anyone of the signal at the parallel lines coupling the sender and the receiver. In case of binary digits, the change of any single one of the signals, or digits, can be detected by detecting a change of the parity of the symbol. In a fifth step 95, the selected symbol is identified, or the information represented by the symbol is identified, by the receiver.

In the first and third embodiments of the sender 10 described above with reference to the FIGS. 1 to 5, the first step 91 is conducted by the symbol selection circuit 13 (or any corresponding circuit not displayed in the FIGS. 2, 3 and 5), and the second step 92 is conducted by the output circuit 12 or the flip-flop FF1, of the sender 10. In the second, fourth, fifth and sixth embodiments of the receiver 20 described above with reference to the FIGS. 1 to 5, the fourth step 94 is conducted by the detection circuit 22 and the fifth step 95 is conducted by the symbol identification circuit 23, or the flip-flop FF3.

As already mentioned, the number of digits of each symbol (and correspondingly the number of lines 3 of the transfer channel 2, the number of outputs 11 of the sender 10 and the number of inputs 21 of the receiver 20) can be arbitrarily adjusted to the information to be transferred from the sender 10 to the receiver 20. Likewise, the number of predetermined values each digit may take on can be arbitrarily adopted to the information transferred from the sender 10 to the receiver 20. It is expected that up to seven parallel lines (corresponding to up to seven digits per symbol) are particularly advantageous for some applications and some embodiments of the present invention. However, for other applications or for other embodiments of the present invention, even higher numbers of parallel lines may be advantageous.

As an example, the transfer of symbols with three binary digits via three parallel lines is now described. In this example, different sets of information (for example "red", "blue", "green", "yellow") can be transferred. "Red" is represented by the symbols "000" and "111"; "blue" is represented by the symbols "011" and "100"; "green" is represented by the symbols "110" and "001"; and "yellow" is represented by the symbols "101" and "010". When the lastly transferred information is "red" represented by the symbol "000", the next information to be transferred can be "blue" represented by the symbol "100", "green" represented by the symbol "001" or "yellow" represented by the symbol "010", wherein always exactly one digit changes. When the lastly sent information is "blue" represented by the symbol "100", the next information to be transferred can be "red" represented by the symbol "000", "green" represented by the symbol "110" or "yellow" represented by the symbol "101", each time changing only one digit. As can be reconstructed easily, after any of the four "colors" any other of the four "colors" can be transferred without changing more or less than exactly one digit of the symbol. Therefore, if there is no necessity to immediately and consecutively transfer the same information twice, four "colors" can be transferred via the three parallel lines in a completely asynchronous and robust way. If there is a need to immediately and consecutively transfer the same information twice, a symbol rotation is necessary and only three "colors" can be transferred via the three parallel lines.

Obviously, if there are only certain but not all theoretically possible sequences of information or "colors" (for example: there is always "blue" after "red" and always "red" or "green" after "blue" but never "green" or "yellow" after "red" and never "yellow" after "blue"), the number of "colors" which can be transmitted via the predefined number of parallel lines can be increased. Furthermore, with more than two predefined values of each digit (represented by the corresponding number of predefined levels of the signal representing the digit) more information, or a bigger number of "colors", can be transferred via the same number of parallel lines.

In all the above-described embodiments, the symbol to be transferred next is preferably selected such that it differs from the lastly transferred symbol by exactly one bit. This provides the advantage that any clock skew, i.e. any differences in the timing of the signals arriving at the receiver, does not influence or corrupt the identification of the information from the symbol. In case of binary digits, a further advantage is that the change of exactly one digit always alters the parity and can, therefore be easily detected by detecting a change of the parity. Throughout the above embodiments, the parity of a symbol comprising binary digits is preferably defined to be even when the number of "1" digits is even, and odd when the number of "0" digits is odd.

However, a change of any number of digits can also indicate the arrival of a new symbol at the receiver. Therefore, it is preferred but not necessary for the present invention that always exactly one digit (and the corresponding signal) change.

All the above-described embodiments provide the advantage that no clock signal is necessary for detecting and identifying a symbol at the receiver. Therefore, preferably no clock signal is transferred from the sender to the receiver. However, internal clock signals at both the sender and the receiver may be provided but need not be synchronized with each other in any way.

An example with three binary digits forming each symbol was already described above. It is important to note that the total amount of information which can be transferred according to some embodiments of the present invention in one symbol comprising three binary digits equals the amount of information which can be transferred via three parallel lines conventionally. A conventional transfer channel comprising three parallel lines comprises two data lines and one clock line. The number of different symbols which can be transferred by binary signals via two lines is four, which equals the number of "colors" which can be transferred in the above-described example. However, for some embodiments of the present invention, a transfer of information needs no training of the timing of any signals and is much more robust. Furthermore, circuitry implementing some embodiments of the present invention is less complex, requires less area in an integrated semiconductor device and requires less (electrical) power than the circuitry required for a conventional transfer. Contrary to a conventional clock recovery circuit or other equivalent conventional circuit, the detection circuit according to some embodiments of the present invention consumes almost no power as long as no signals arrive. This causes a further reduction of the power consumption.

The preceding description only describes advantageous exemplary embodiments of the invention. The features disclosed therein and the claims and the drawings can, therefore, be essential for the realization of the invention in its various embodiments, both individually and in any combination. While the forgoing is directed to embodiments of the present invention, other and further embodiments of this invention may be devised without departing from the basic scope of the invention, the scope of the present invention being determined by the claims that follow.

The invention claimed is:

1. A method of transferring information from a sender to a receiver, the method comprising:
    selecting a symbol out of a plurality of symbols representing the information, wherein each of the plurality of symbols representing the information comprises a number of digits, the number of digits equaling a number of parallel lines coupling the sender and the receiver; and
    sending the digits of the selected symbol from the sender to the receiver, wherein, a signal representing one of the number of digits of the selected symbol is transferred via each of the number of lines,
    wherein, in the step of selecting a symbol, the symbol is selected such that the symbol differs from a lastly transferred symbol by one digit.

2. The method of claim 1, wherein each digit may take one of a predetermined plurality of predetermined values and wherein each value of each digit is represented by one of a predetermined plurality of levels of the signal.

3. The method of claim 2, wherein the predetermined plurality of predetermined values of the digit comprises the values "0" and "1", wherein a predetermined low level of a signal represents one of the predetermined plurality of predetermined values of the digit, and wherein a predetermined high level of the signal represents the other one of the predetermined plurality of predetermined values.

4. The method of claim 1, wherein in the step of selecting a symbol, the symbol is always selected such that the parity of the symbol is different from a parity of the lastly transferred symbol if the information is different from the lastly transferred information.

5. The method of claim 3, wherein in the step of selecting a symbol, the symbol is always selected such that the parity of the symbol is different from a parity of the lastly transferred symbol if the information is different from the lastly transferred information.

6. The method of claim 1, wherein the sender is a memory controller, the receiver is a memory device, and the information is control information controlling the operation of the memory device.

7. The method of claim 1, wherein the sender is a memory device, the receiver is a memory controller, and the information indicates an operational state of the memory device.

8. An integrated circuit with a sender, the sender comprising:
    a number of outputs;
    an output circuit coupled to the number of outputs and configured to transfer symbols via the number of outputs, wherein each symbol comprises a number of digits, the number of digits equaling the number of outputs, and the output circuit configured to transfer, via each of the number of outputs, a signal representing one of the number of digits; and
    a symbol selection circuit configured to receive information and select a symbol out of a plurality of symbols representing the information, wherein the symbol selection circuit is configured to select the symbol such that the symbol differs from a lastly transferred symbol in one digit.

9. The integrated circuit of claim 8, wherein each digit may take one of a predetermined plurality of predetermined values and wherein each value of each digit is represented by one of a predetermined plurality of levels of the signal.

10. The integrated circuit of claim 9, wherein the predetermined plurality of predetermined values of the digit comprises the values "0" and "1", wherein a predetermined low level of a signal represents one of the predetermined plurality of predetermined values of the digit, and wherein a predetermined high level of the signal represents the other one of the predetermined plurality of predetermined values.

11. The integrated circuit of claim 10, wherein the symbol selection circuit selects a symbol such that a parity of the symbol is different from a parity of a lastly transferred symbol if the information are different from the previously transferred information.

12. The integrated circuit of claim 8, wherein the sender is a memory controller and the information is control information controlling the operation of a memory device.

13. The integrated circuit of claim 8, wherein the sender is a memory device, and the information indicates an operational state of the memory device.

14. An integrated circuit with a receiver, the receiver comprising:
    a number of inputs;
    a detection circuit coupled to the number of inputs and configured to receive symbols via the number of inputs, wherein each symbol comprises of a number of digits, the number of digits equaling the number of inputs, the detection circuit configured to receive, via each of the number of inputs, a signal representing one of the number of digits, and the detection circuit configured to detect an incoming symbol from a change of one signal at the number of inputs; and
    a symbol identification circuit configured to receive, controlled by the detection circuit, the incoming symbol and identify information represented by the symbol when the detection circuit detects an incoming symbol.

15. The integrated circuit of claim 14, wherein the detection circuit is configured to detect an incoming symbol from a change of a parity of the symbol.

16. The integrated circuit of claim 14, wherein the detection circuit is configured to detect an incoming signal from a change of any signal at the number of input from one predetermined level out of a predetermined plurality of predetermined levels of the signal to another predetermined level out of the predetermined plurality of predetermined levels of the signal; and the symbol identification circuit identifying each digit of the symbol by identifying a predetermined level out of the predetermined plurality of predetermined levels at the corresponding line.

17. The integrated circuit of claim 16, wherein each digit is either "0" or "1", wherein each of a predetermined low level and a predetermined high level represents one of the values "0" and "1".

18. The integrated circuit of claim 17, wherein the detection circuit comprises:
a first XOR-gate, each of the number of inputs being coupled to a corresponding input of the first XOR-gate and each of the inputs of the first XOR-gate being coupled to one of the number of inputs.

19. The integrated circuit of claim 18, wherein the detection circuit further comprises:
a second XOR-gate; and
a serial connection of an even number of inverters,
wherein an output of the first XOR-gate is coupled to a first input of the second XOR-gate, and wherein the output of the first XOR-gate is coupled to a second input of the second XOR-gate via the serial connection of inverters.

20. The integrated circuit of claim 19, wherein the output of the first XOR-gate is directly coupled to the first input of the second XOR-gate.

21. The integrated circuit of claim 18, wherein the detection circuit further comprises:
a second XOR-gate; and
a flip-flop,
wherein an output of the first XOR-gate is coupled to a first input of the second XOR-gate, wherein the output of the first XOR-gate is coupled to an input of the flip-flop, wherein an output of the flip-flop is coupled to a second input of the second XOR-gate, and wherein a clock input of the flip-flop is coupled to an output of the second XOR-gate.

22. The integrated circuit of claim 21, wherein the output of the first XOR-gate is directly coupled to the first input of the second XOR-gate.

23. A system for transferring information, the system comprising a sender and a receiver;
the sender comprising:
a number of outputs;
an output circuit coupled to the number of outputs and configured to transfer symbols via the number of outputs, wherein each symbol comprises a number of digits, the number of digits equaling the number of outputs, and the output circuit configured to transfer, via each of the number of outputs, a signal representing one of the number of digits; and
a symbol selection circuit configured to receive information and select a symbol out of a plurality of symbols representing the information, the symbol selection circuit configured to select the symbol such that the symbol differs from a lastly transferred symbol in one digit, and
the receiver comprising:
a number of inputs;
a detection circuit coupled to the number of inputs and configured to receive symbols via the number of inputs, wherein each symbol comprises of a number of digits, the number of digits equaling the number of inputs, the detection circuit configured to receive, via each of the number of inputs, a signal representing one of the number of digits, and the detection circuit configured to detect an incoming symbol from a change of one signal at the number of inputs; and
a symbol identification circuit configured to receive, controlled by the detection circuit, the incoming symbol and identify information represented by the symbol when the detection circuit detects an incoming symbol.

24. The system of claim 23, wherein the symbol selection circuit selects the symbol such that a parity of the symbol is different from a parity of the lastly transferred symbol if the information is different from the lastly transferred information.

25. The integrated circuit of claim 23, the detection circuit further comprising:
a first XOR-gate, each of the number of inputs being coupled to a corresponding input of the first XOR-gate and each of the inputs of the first XOR-gate being coupled to one of the number of inputs.

26. The integrated circuit of claim 23, the detection circuit further comprising:
a second XOR-gate; and
a serial connection of an even number of inverters,
wherein an output of the first XOR-gate is coupled to a first input of the second XOR-gate, and wherein the output of the first XOR-gate is coupled to a second input of the second XOR-gate via the serial connection of inverters.

* * * * *